US008472743B2

(12) United States Patent
Tezaur

(10) Patent No.: US 8,472,743 B2
(45) Date of Patent: Jun. 25, 2013

(54) METHOD FOR ESTIMATING OF DIRECTION OF MOTION BLUR IN AN IMAGE

(75) Inventor: Radka Tezaur, Mountain View, CA (US)

(73) Assignee: Nikon Corporation, Tokyo (JP)

( * ) Notice: Subject to any disclaimer, the term of this patent is extended or adjusted under 35 U.S.C. 154(b) by 398 days.

(21) Appl. No.: 12/740,664

(22) PCT Filed: Mar. 6, 2008

(86) PCT No.: PCT/US2008/003012
§ 371 (c)(1),
(2), (4) Date: Apr. 29, 2010

(87) PCT Pub. No.: WO2009/110868
PCT Pub. Date: Sep. 11, 2009

(65) Prior Publication Data
US 2010/0260431 A1    Oct. 14, 2010

(51) Int. Cl.
*G06K 9/40*    (2006.01)
(52) U.S. Cl.
USPC .......................................... 382/255; 382/264
(58) Field of Classification Search
None
See application file for complete search history.

(56) References Cited

U.S. PATENT DOCUMENTS

| | | | |
|---|---|---|---|
| 7,978,346 B1 * | 7/2011 | Riza | 356/627 |
| 2003/0011717 A1 * | 1/2003 | McConica | 348/699 |
| 2005/0231603 A1 * | 10/2005 | Poon | 348/208.99 |
| 2005/0243178 A1 | 11/2005 | McConica | |
| 2006/0098890 A1 | 5/2006 | Steinberg | |

OTHER PUBLICATIONS

Felix Krahmer et al., "Blind Image Deconvolution: Motion Blur Estimation" University of Minnesota IMA Preprint Series No. 2133-5 (Sep. 2006).*
International Preliminary Report on Patentability for PCT/US08/03012 (related to the present application), publication date Nov. 2, 2010, Nikon Corporation.
Frederique Crete et al., The blur effect: perception and estimation with a new non-reference perceptual blur metric, presented at IS&T/SPIE 19th Annual Symposium, 2007 San Jose, CA US, SPIE vol. 6492, 649201, © 2007 SPIE-IS&T.
Felix Krahmer, et al., Blind Image Deconvolution: Motion Blur Estimation, Institute for Mathematics and its Applications, Sep. 2006, University of Minnesota, IMA Preprint Series #2133-5, Minneapolis, MN US.

(Continued)

*Primary Examiner* — Barry Drennan
*Assistant Examiner* — Andrew Moyer
(74) *Attorney, Agent, or Firm* — Roeder & Broder LLP

(57) ABSTRACT

A method for estimating a blur direction (20) of motion blur (16) in a blurred image (14) includes the steps of blurring the blurred image (14) in a number of different test directions (360A) (362A) (364A), and finding the test direction (360A) (362A) (364A) for which the blurred image (14) changes the least by the additional blurring (366). With this design, when more blur (366) is applied to the blurred image (14) in a test direction (360A) (362A) (364A) that is similar to the blur direction (20), the difference in the image appearance is relatively small. However, when more blur (366) is applied to the blurred image (14) in a test direction (360A) (362A) (364A) that is very different to the blur direction (20), the difference in the image appearance is relatively large. In one embodiment, a blur difference is determined for each test direction (360A) (362A) (364A). Subsequently, the test direction (360A) (362A) (364A) with the smallest blur difference is selected as the blur direction (20). Alternatively, the estimated blur direction (20) can be perpendicular to the test direction (360A) (362A) (364A) with the largest blur difference.

20 Claims, 5 Drawing Sheets

OTHER PUBLICATIONS

Jan Biedmond, et al., Iterative Methods for Image Deblurring, Proceedings of the IEEE, May 1990, pp. 856-883, vol. 78, No. 5 © 1990 IEEE.

Y. Yitzhaky et al., Identification of Blur Parameters from Motion Blurred Images, Sep. 1997, pp. 310-320, Graphical Models and Image Processing, vol. 59, No. 5, Article No. IP970435, © 2007 by Academic Press.

Y. Yitzhaky et al., Comparison of direct blind deconvolution methods for motion-blurred images, Jul. 10, 1997, Applied Optics, vol. 38, No. 20, © 1999 Optical Society of America.

International Search Report and Written Opinion for PCT/US08/03012 (related to the present application), publication date Jun. 24, 2008, Nikon Corporation.

* cited by examiner

METHOD FOR ESTIMATING OF DIRECTION OF MOTION BLUR IN AN IMAGE

BACKGROUND

Cameras are commonly used to capture an image of a scene that includes one or more objects. Unfortunately, some of the images are blurred. For example, movement of the camera and/or movement of the objects in the scene during the exposure time of the camera can cause motion blur in the image that is mainly in the direction of motion.

There exists a number of deconvolution methods for reducing blur in a blurry image. These methods either require the point spread function ("PSF"), which describes the blur, to be known or automatically estimated. Typically, the methods that estimate the PSF require a good initial guess for certain blur parameters, such as blur direction.

SUMMARY

The present invention is directed to a method for estimating a blur direction of motion blur in a blurred image. The method includes the steps of blurring the blurred image along a first test direction to create an artificially blurred first test image, blurring the blurred image along a second test direction to create an artificially blurred second test image, and evaluating the test images to estimate the blur direction. As an overview, in certain embodiments, the proposed method for estimating the prevailing blur direction of motion blur is based on blurring the blurred image in a plurality of different test directions, and finding the test direction for which the blurred image changes the least by the additional blurring. The main idea behind this method is that when more blur is applied to the blurred image in a test direction that is similar to the blur direction, the difference in the image appearance is relatively small. However, when more blur is applied to the blurred image in a test direction that is very different to the blur direction, the difference in the image appearance is relatively large.

As provided herein, the test blur is applied to the image in a number of test directions. Subsequently, the test direction which results in the smallest change can be selected as the blur direction.

In one embodiment, the step of evaluating the test images includes the step of (i) comparing the first test image with the blurred image to determine a first blur difference between the first test image and the blurred image, and (ii) comparing the second test image with the blurred image to determine a second blur difference between the second test image and the blurred image. In this embodiment, if the first blur difference is larger (e.g. worse) than the second blur difference, the first test direction is not similar to the blur direction. Somewhat similarly, if the second blur difference is larger (e.g. worse) than the first blur difference, the second test direction is not similar to the blur direction.

The present invention is also directed to a device for estimating a blur direction of motion blur in a blurred image. In this embodiment, a control system can perform some or all of the steps described above.

In yet another embodiment, the present invention is directed to a method and device for deconvolving the blurred image.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
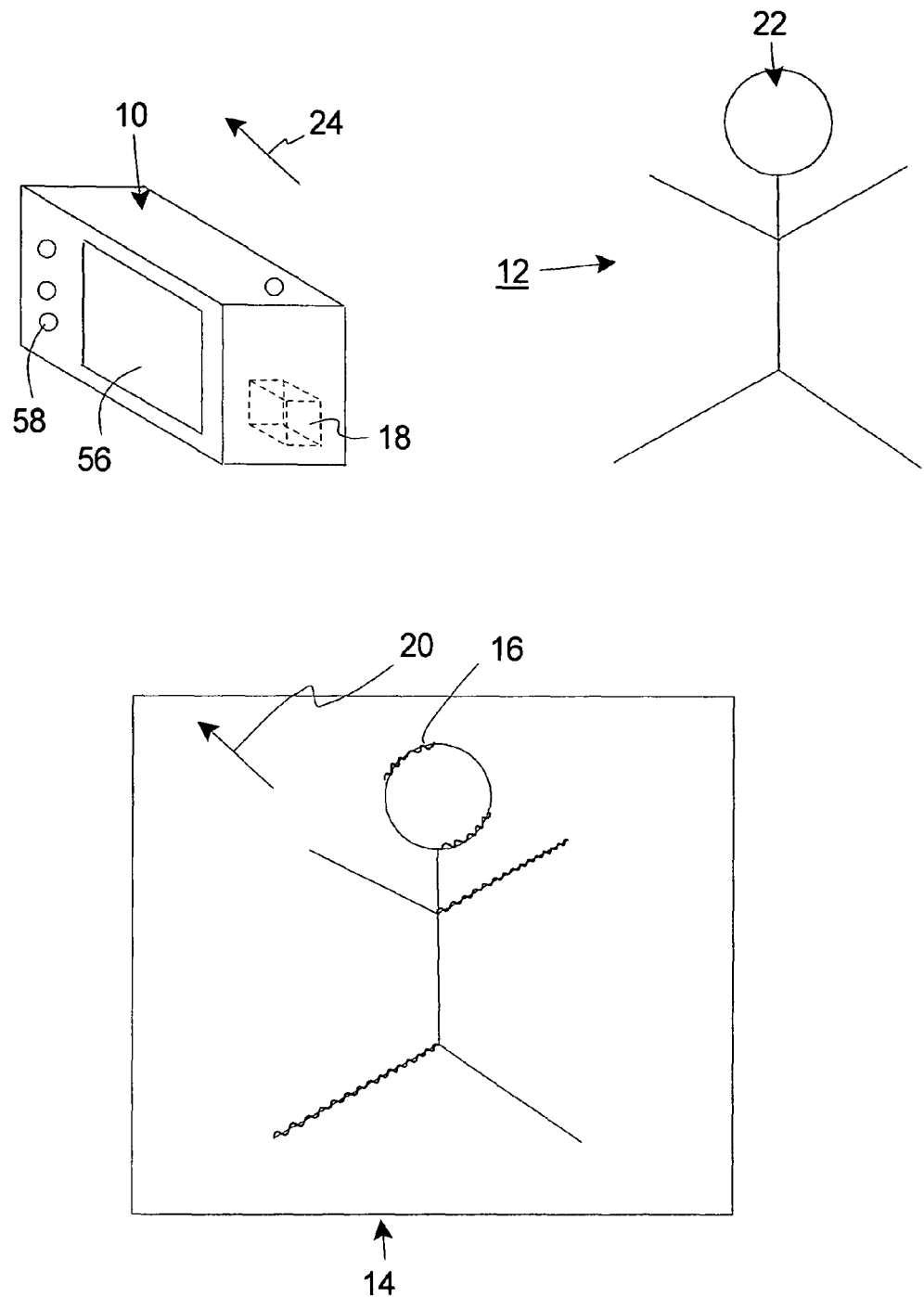
FIG. 1 is a simplified view of a scene, an image apparatus having features of the present invention, and a blurred image.

FIG. 1 is a simplified perspective illustration of an image apparatus 10 having features of the present invention, and a scene 12. The image apparatus 10 captures a raw captured image 14 (illustrated away from the image apparatus 10) that can be blurred 16 (illustrated as a thicker, wavy line). In one embodiment, the image apparatus 10 includes a control system 18 (illustrated in phantom) that uses a unique method for estimating an unknown direction 20 (illustrated as an arrow) of motion blur 16 in the blurred image 14. In certain embodiments, with information regarding the blur direction 20 in the blurred image 14, the amount of blur 16 in the image 14 can be accurately reduced.

As an overview, in one embodiment, the proposed method for estimating the prevailing blur direction 20 of motion blur 16 is based on blurring the captured image 14 in a number of different test directions, and finding the test direction for which the blurred image 14 changes the least by the additional blurring. The main idea behind this method is that when more blur is applied to the blurred image 14 in a test direction that is similar to the blur direction 20, the difference in the image appearance is relatively small. However, when more blur is applied to the blurred image 14 in a test direction that is very different to the blur direction 20, the difference in the image appearance is relatively large.

In another embodiment, the present invention searches for the blur direction that causes the greatest difference in image appearance between the captured image 14 and the blurred captured image. This is the direction that is most different from the direction of blur, i.e. perpendicular to the direction of blur.

In yet another embodiment, the blur direction is estimated by (i) selecting the test direction that results in the least change as a first possible direction, (ii) selecting a direction that is perpendicular to the test direction that results in the greatest change as a second possible direction, and (iii) using (e.g. averaging) the first possible direction and the second possible direction to estimate the blur direction to improve the robustness of blur direction estimation.

The type of scene 12 captured by the image apparatus 10 can vary. For example, the scene 12 can include one or more objects 22, e.g. animals, plants, mammals, and/or environments. For simplicity, in FIG. 1, the scene 12 is illustrated as including one object 22. Alternatively, the scene 12 can include more than one object 22. In FIG. 1, the object 22 is a simplified stick figure of a person.

It should be noted that movement of the image apparatus 10 and/or movement of the object 22 in the scene 12 during the capturing of the blurred image 14 can cause motion blur 16 in the blurred image 14 that is mainly in the blur direction 20. For example, in FIG. 1, the image apparatus 10 was moved along a substantially motion direction 24 (illustrated as an arrow) during the exposure time while capturing the blurred image 14. As a result thereof, the blurred image 14 has blur 16 in the blur direction 20 that corresponds to the motion direction 24.

It should be noted that the motion direction 24 is usually random and can be different than that illustrated in FIG. 1. For example, the motion direction 24 can be up and down. This motion can be non-uniform linear motion. Alternatively, the motion can be non-linear.

Figure 2:
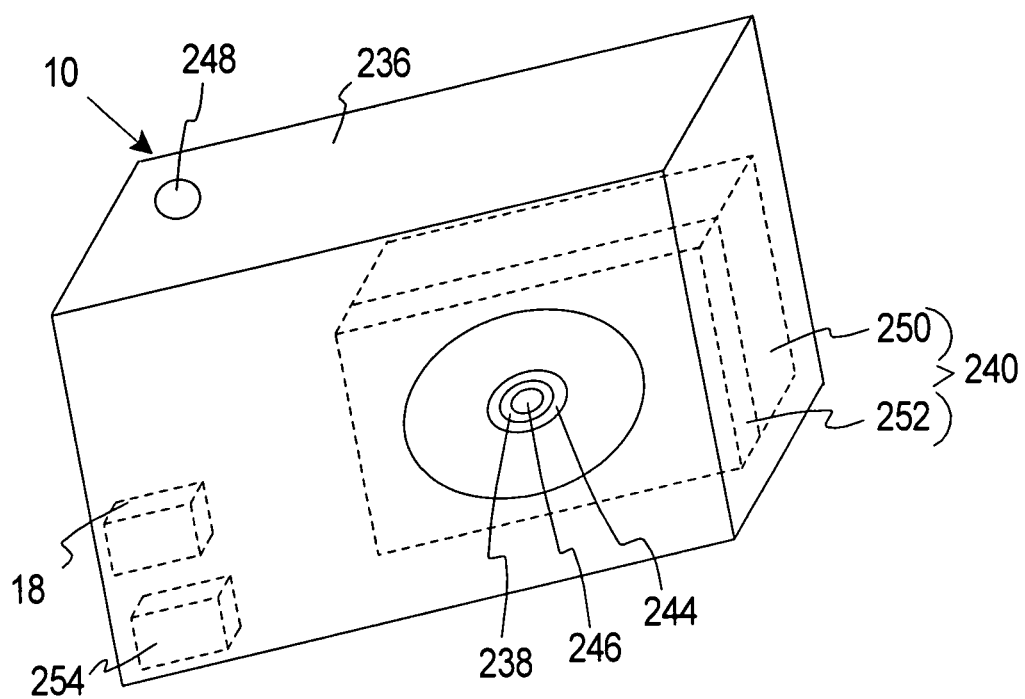
FIG. 2 is a simplified front perspective view of the image apparatus of FIG. 1.

FIG. 2 illustrates a simplified, front perspective view of one, non-exclusive embodiment of the image apparatus 10. In this embodiment, the image apparatus 10 is a digital camera, and includes an apparatus frame 236, an optical assembly 238, and a capturing system 240 (illustrated as a box in phantom), in addition to the control system 18 (illustrated as a box in phantom). The design of these components can be varied to suit the design requirements and type of image apparatus 10. Further, the image apparatus 10 could be designed without one or more of these components. Additionally or alternatively, the image apparatus 10 can be designed to capture a video of the scene 12.

The apparatus frame 236 can be rigid and support at least some of the other components of the image apparatus 10. In one embodiment, the apparatus frame 236 includes a generally rectangular shaped hollow body that forms a cavity that receives and retains at least some of the other components of the camera.

The apparatus frame 236 can include an aperture 244 and a shutter mechanism 246 that work together to control the amount of light that reaches the capturing system 240. The shutter mechanism 246 can be activated by a shutter button 248. The shutter mechanism 246 can include a pair of blinds (sometimes referred to as "blades") that work in conjunction with each other to allow the light to be focused on the capturing system 240 for a certain amount of time. Alternatively, for example, the shutter mechanism 246 can be all electronic and contain no moving parts. For example, an electronic capturing system 240 can have a capture time controlled electronically to emulate the functionality of the blinds.

The optical assembly 238 can include a single lens or a combination of lenses that work in conjunction with each other to focus light onto the capturing system 240. In one embodiment, the image apparatus 10 includes an autofocus assembly (not shown) including one or more lens movers that move one or more lenses of the optical assembly 238 in or out until the sharpest possible image of the subject is received by the capturing system 240.

The capturing system 240 captures information for the raw blurred image 14 (illustrated in FIG. 1). The design of the capturing system 240 can vary according to the type of image apparatus 10. For a digital type camera, the capturing system 240 includes an image sensor 250 (illustrated in phantom), a filter assembly 252 (illustrated in phantom), and a storage system 254 (illustrated in phantom).

The image sensor 250 receives the light that passes through the aperture 244 and converts the light into electricity. One non-exclusive example of an image sensor 250 for digital cameras is known as a charge coupled device ("CCD"). An alternative image sensor 250 that may be employed in digital cameras uses complementary metal oxide semiconductor ("CMOS") technology.

The image sensor 250, by itself, produces a grayscale image as it only keeps track of the total quantity of the light that strikes the surface of the image sensor 250. Accordingly, in order to produce a full color image, the filter assembly 252 is generally used to capture the colors of the image.

The storage system 254 stores the various raw images 14 (illustrated in FIG. 1) and/or one or more adjusted images 455 (illustrated in FIG. 4) before these images are ultimately printed out, deleted, transferred or downloaded to an auxiliary storage system or a printer. The storage system 254 can be fixedly or removably coupled to the apparatus frame 236. Non-exclusive examples of suitable storage systems 254 include flash memory, a floppy disk, a hard disk, or a writeable CD or DVD.

The control system 18 is electrically connected to and controls the operation of the electrical components of the image apparatus 10. The control system 18 can include one or more processors and circuits, and the control system 18 can be programmed to perform one or more of the functions described herein. In FIG. 2, the control system 18 is secured to the apparatus frame 236 and the rest of the components of the image apparatus 10. Further, the control system 18 is positioned within the apparatus frame 236.

In certain embodiments, the control system 18 includes software that estimates the blur direction 20 of motion blur 16 in the blurred image 14. Further, the control system 18 can include software that reduces the blur 16 in the blurred image 14 to provide the adjusted image 455.

Figure 4:
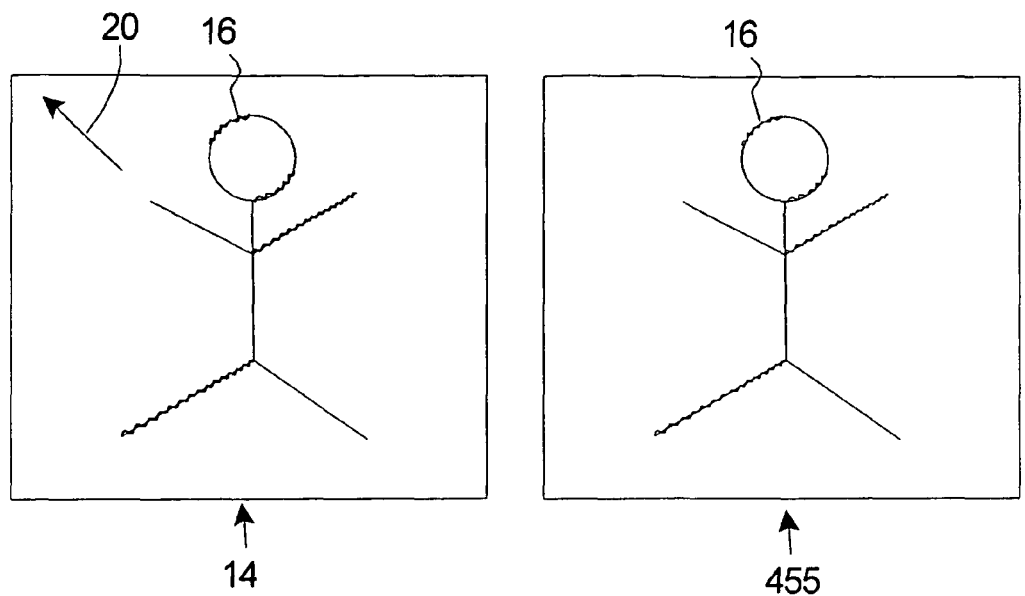
FIG. 4 illustrates the blurred image, and an adjusted image.

Referring back to FIG. 1, the image apparatus 10 includes an image display 56 that displays the blurred image 14 and/or the adjusted images 455 (illustrated in FIG. 4). With this design, the user can decide which images 14, 455 should be stored and which images 14, 455 should be deleted. In FIG. 1, the image display 56 is fixedly mounted to the rest of the image apparatus 10. Alternatively, the image display 56 can be secured with a hinge mounting system (not shown) that enables the display 56 to be pivoted. One non-exclusive example of an image display 56 includes an LCD screen.

Further, the image display 56 can display other information that can be used to control the functions of the image apparatus 10.

Moreover, the image apparatus 10 can include one or more control switches 58 electrically connected to the control system 18 that allows the user to control the functions of the image apparatus 10. For example, one or more of the control switches 58 can be used to selectively switch the image apparatus 10 to the blur direction 20 estimation processes and/or deblurring processes disclosed herein.

Figure 3:
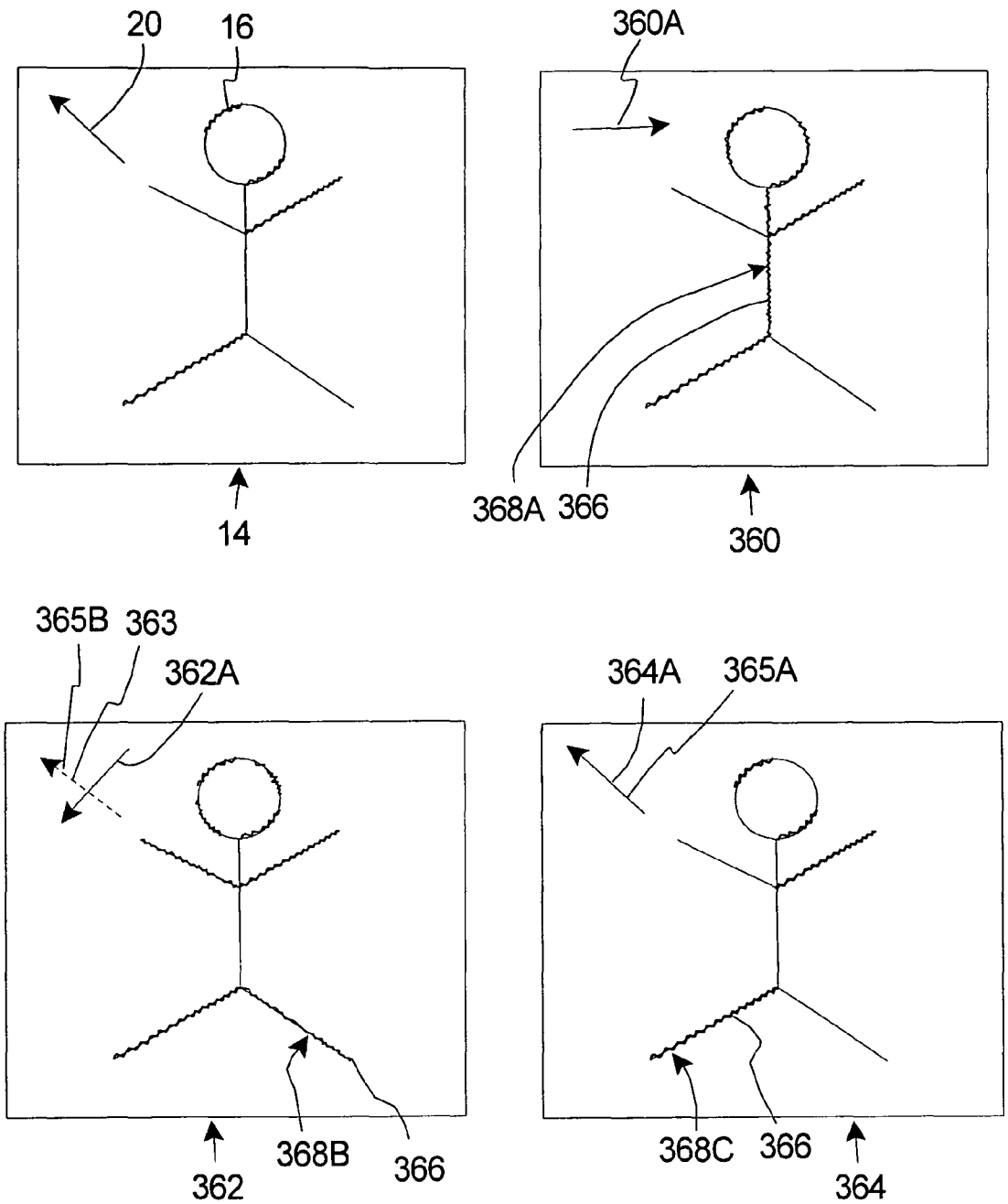
FIG. 3 illustrates the blurred image, an artificially blurred first test image, an artificially blurred second test image, and an artificially blurred third test image.

FIG. 3 illustrates the blurred image 14, an artificially blurred first test image 360, an artificially blurred second test image 362, and an artificially blurred third test image 364. In this embodiment, the first test image 360 is the blurred image 14 that has been artificially blurred in a first test direction 360A (illustrated as an arrow); the second test image 362 is the blurred image 14 that has been artificially blurred in a second test direction 362A (illustrated as an arrow) that is different than the first test direction 360A; and the third test image 364 is the blurred image 14 that has been artificially blurred in a third test direction 364A (illustrated as an arrow) that is different than the first test direction 360A and the second test direction 362A.

As briefly discussed above, the proposed method for estimating the prevailing, unknown blur direction 20 of motion blur 16 is based on blurring the blurred image 14 in the different test directions 360A, 362A, 364A and finding the test image 360A, 362, 364 for which the blurred image 14 changes the least by the additional blurring 366.

The number of test images 360, 362, 364 used in the estimation and the difference between the test directions 360A, 362A, 364A can vary pursuant to the teachings provided herein. Generally speaking, the accuracy of the estimation can increase as the number of test images 360, 362, 364 is increased, but the computational complexity also increases as the number of test images 360, 362, 364 created is increased. In FIG. 3, only three test images 360, 362, 364 are provided for simplicity and the test directions 360A, 362A, 364A are oriented approximately 120 degrees apart. In alternative non-exclusive embodiments, ten, twenty, thirty, thirty-six, seventy-two, or three hundred and sixty test images 360, 362, 364 can be generated, and the test directions 360A, 362A, 364A can be spaced apart approximately thirty-six, eighteen, twelve, ten, five, or one degrees.

In one example, if the blurred image 14 is a monochrome image, it can be represented as a single pixel matrix. Alternatively, if the blurred image 14 is a color image, it can be represented by three pixel matrices, for example a red channel pixel matrix, a green channel pixel matrix, and a blue channel pixel matrix. In one embodiment, the brightness value at each pixel is expressed by a number between 0-255. It should be noted that this typically applies only to images that already were processed by a camera. The raw images captured by sensor, however, are typically 12 or 14 bit images, that is, with values between 0 and 4095 or 16383, respectively. The blur direction estimation can be applied to the processed images, but it could also be implemented as a part of image processing pipeline (before images are reduced to 8 bits, i.e. values 0-255).

In one embodiment, each of the test images 360, 362, 364 is generated by artificially blurring the captured image 14 in the respective test direction 360A, 362A, 364A. For example, to generate the first test image 360, a convolution operation is performed on the blurred image 14 with a matrix representing Point Spread Function ("PSF") corresponding to blurring in the horizontal direction. Thus, each of the test images 360, 362, 364 can be generated using the convolution operation.

As provided herein, when more blur 366 is applied to the blurred image 14 in a test direction 360A, 362A, 364A that is similar to the blur direction 20, the difference in the image appearance is relatively small. However, when more blur 366 is applied to the blurred image 14 in a test direction 360A, 362A, 364A that is very different to the blur direction 20, the difference in the image appearance is relatively large. Thus, with the present invention, each test image 360, 362, 364 is individually compared to blurred image 14 to determine a blur difference between each test image 360, 362, 364 and the blurred image 14. If the blur difference is large, the respective test direction 360A, 362A, 364A is not similar to the blur direction 20; and if the blur difference is small, the respective test direction 360A, 362A, 364A is similar to the blur direction 20.

For example, when the first test image 360 is compared to the blurred image 14, a first blur difference 368A exists between the first test image 360 and the blurred image 14. Similarly, when the second test image 362 is compared to the blurred image 14, a second blur difference 368B exists between the second test image 362 and the blurred image 14. Further, when the third test image 364 is compared to the blurred image 14, a third blur difference 368C exists between the third test image 364 and the blurred image 14.

In one non-exclusive example, for a color image, the first blur difference 368A can be calculated with the control system 18 (illustrated in FIG. 1) by comparing the brightness value at each pixel in each channel matrix for the blurred image 14 to the brightness value at each pixel in each channel matrix in the first test image 360. The second blur difference 368B and the third blur difference 368C can be calculated in a somewhat similar fashion. In this example, blur difference can be calculated for each channel, and values averaged to possibly get a more robust blur direction estimate. However, this method can be computationally very expensive.

In another example, a color image would first be converted to black and white, for example by taking the average of the three color channels, or by selecting one of the channels (usually the green one is used). Next, the method is applied to the resulting black and white image.

Alternatively or additionally, one or more of the blur difference values can be generated by interpolation information from previously generated blur difference values for test images 360, 362, 364 that were generated using the convolution operation. In one non-exclusive embodiment, test images are generated at five degree intervals using the convolution method. Subsequently, additional blur difference values can be generated at one degree increments between the previously generated blur difference values for the test images using interpolation.

In the example illustrated in FIG. 3, comparing the blurred image 14 to the first test image 360, the first test image 360 includes significant additional blurring 366 and the first test image 360 has a large first blur difference 368A. This is because the first test direction 360A is very different than the blur direction 20. Somewhat similarly, in this example, comparing the blurred image 14 to the second test image 362, the second test image 362 includes significant additional blurring 366 and the second test image 362 has a large second blur difference 368B. This is because the second test direction 362A is also very different than the blur direction 20. Additionally, in this example, comparing the blurred image 14 to the third test image 364, the third test image 364 does not include significant additional blurring 366 and the third test image 364 has a small third blur difference 368C. This is because the third test direction 364A is very similar to the blur direction 20.

In this example, because the first blur difference 368A and the second blur difference 368B are larger than the third blur difference 368C, the control system 18 estimates that the third test direction 364A is similar to the blur direction 20. Thus, the third blur difference 368C is the best.

It should be noted that the difference between what is considered a large blur difference and what is considered a small blur difference will vary according to the content of the image and many other factors, such as size of the image. Also, there are a number of different ways how to measure the difference between two images. The resulting value can be practically any number or designation that can be used to compare the values for the different directions in the same image.

In one embodiment, the blur differences 368A-368C for some or all of the test images 360, 362, 364 can be directly compared. As provided herein, the test direction 360A, 362A, 364A for the test image 360, 362, 364 with the best (lowest in this example) blur difference 368A-368C is estimated by the control system 18 to be substantially similar to the unknown blur direction 20 of the captured image 14.

In this example, because the first blur difference 368A and the second blur difference 368B are greater than the third blur difference 368C, the third test direction 364A is estimated by the control system 18 as the blur direction 20. Stated in another fashion, because the first blur difference 368A and the second test difference 368B are greater than the third blur difference 368C, the first test direction 360A and the second test direction 362A are not similar to the blur direction 20.

In another embodiment, the control system 18 searches for the blur direction that causes the largest blur difference, e.g.

the greatest difference in image appearance between the captured image 14 and the blurred captured image. This is the direction that is most different from the direction of blur 20, i.e. perpendicular to the direction of blur 20. In FIG. 3, the second blur difference 368B is larger than the first blur difference 368A and the third blur difference 368C. In this embodiment, a direction 363 (illustrated with dashed line) that is perpendicular to the second test direction 362A is selected by the control system 18 as the blur direction.

In yet another embodiment, the blur direction is estimated by the control system 18 by (i) selecting the test direction that results in the least change as a first possible direction 365A (e.g. the third test direction 364A in the example illustrated in FIG. 3), (ii) selecting a direction 363 that is perpendicular to the test direction (e.g. the second test direction 362A in the example illustrated in FIG. 3) that results in the largest change as a second possible direction 365B, and (iii) using (e.g. averaging) the first possible direction 365A and the second possible direction 365B to estimate the blur direction 20 to improve the robustness of blur direction estimation.

FIG. 4 illustrates the blurred image 14, and the adjusted image 455. In this embodiment, after the blur direction 20 is estimated, the control system 18 (illustrated in FIG. 1) can perform one or more deblurring techniques to target the blur 16 in the blurred image 14 to provide the adjusted image 455. For example, accelerated Lucy-Richardson deconvolution can be performed on the blurred image 14 to provide the adjusted image 455. In this example, the adjusted image 455 has significantly less blur 16 than the capture image 14.

To deblur an image, you have to know the PSF (which is the function that describes how the image is blurred). In case of a motion blur, an assumption is often made that the motion is uniform linear motion (in practice it works only for relatively small blurs, though). In that case, to find the PSF you need to estimate blur direction and blur length. The present invention deals with determining the direction of motion blur. A separate method may be necessary to estimate blur length.

So called "blind deconvolution methods" assume that the PSF is unknown and they attempt both to find PSF and to produce a deblurred image at the same time. These methods are typically iterative methods, they require some initial guess for PSF, and this initial guess needs to be close enough to the real PSF for the method to be successful. Knowing the blur direction can help to generate a good initial guess.

Figure 5:
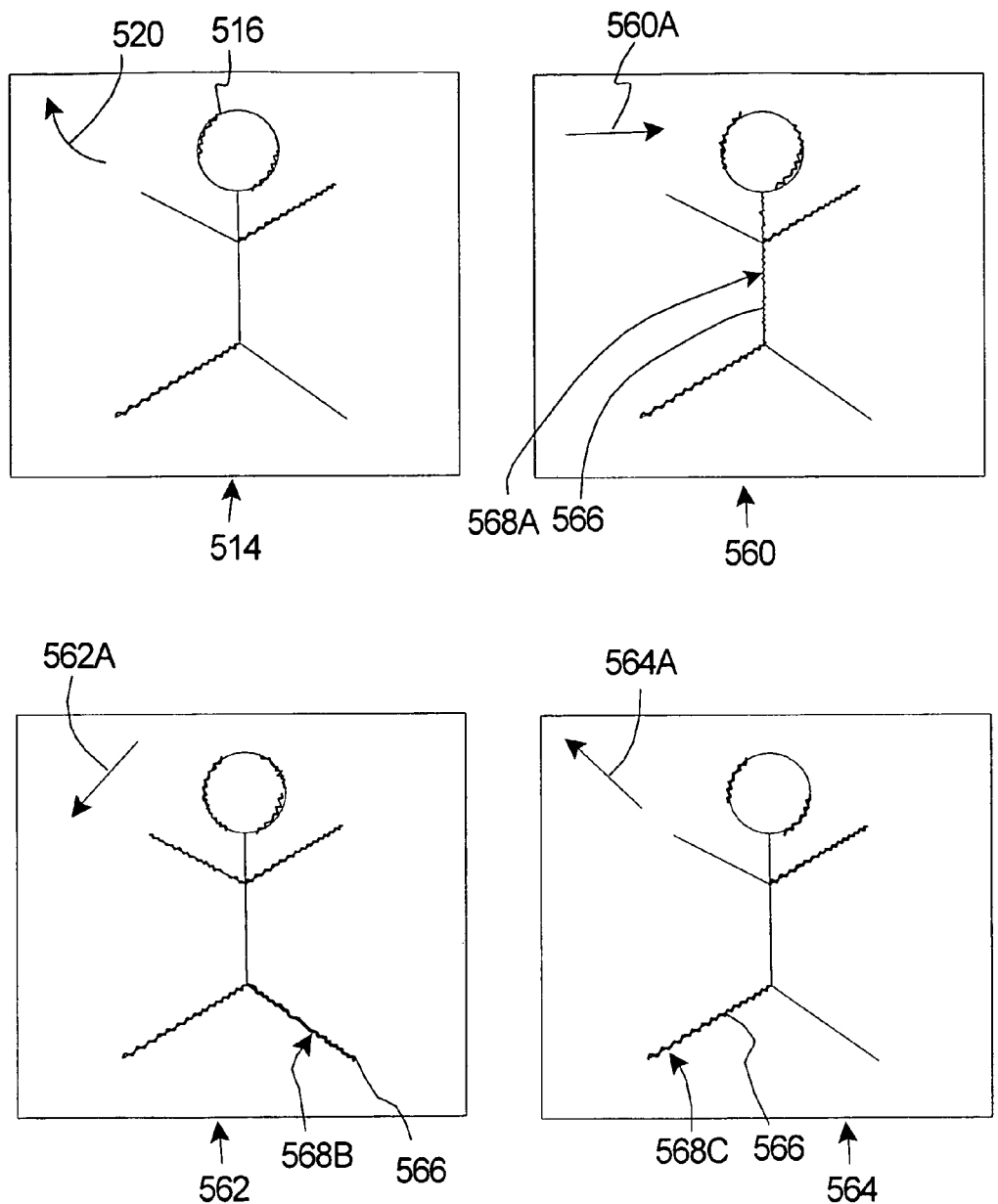
FIG. 5 is a simplified view of another blurred image, another artificially blurred first test image, another artificially blurred second test image, and another artificially blurred third test image.

FIG. 5 is a simplified view of another blurred image 514, another artificially blurred first test image 560, another artificially blurred second test image 562, and another artificially blurred third test image 564. In this example, the blur direction 520 is slightly different than the blur direction 20 illustrated in FIG. 1. More specifically, in this example, the image apparatus 10 (illustrated in FIG. 1) was moved in a slightly arch shaped non-linear motion instead of in a straight motion.

In this embodiment, the test images 560, 562, 564 are again generated by adding blur 566 in the respective blur test direction 560A, 562A, 564A to the blurred captured image 514. Subsequently, a blur difference 568A-568C is again calculated for each of the test images 560, 562, 564. Finally, the test direction 560A, 562A, 564A for the test image 560, 562, 564 with the best (lowest in this example) blur difference 568A-568C is estimated to be the blur direction 20 in the captured image 514 with the control system 18 (illustrated in FIG. 1).

In this example, the third blur difference 568C is again the best (e.g. lowest) and the third test direction 564A is again estimated as the blur direction 520 by the control system 18. With information regarding the blur direction 520, the blurred image 512 can be accurately deblurred.

It should be noted that in this example, to some extent, even for non-linear motion blur 520, that a general direction of linear motion blur can be estimated. In practice, the blur is pretty much always non-linear. If it is only slightly non-linear, as it often happens with relatively short blurs, you can estimate its approximate length and direction and use linear uniform motion blur PSF to deblur the image. It will not be the exact PSF, but it might be good enough approximation. If the blur is heavily non-linear, than the PSF may need to be estimated by some blind deconvolution method. In that case knowing a preliminary blur direction helps to create a good initial estimate of PSF that these method need.

Additionally, because the present invention is based on blurring an image, it is very robust with respect to noise.

Moreover, the developed method can be used as a part of assessment of the quality of algorithms for the removal of compression artifacts in still images and video.

Figure 6:
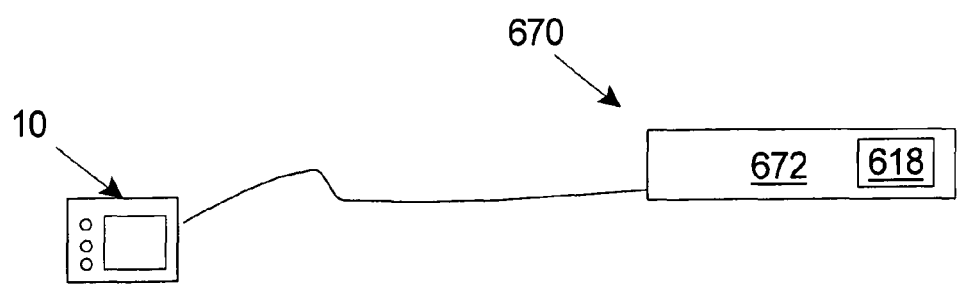
FIG. 6 illustrates another embodiment of a system having features of the present invention.

FIG. 6 illustrates another embodiment of an estimating system 670 having features of the present invention. In this embodiment, the image apparatus 10 again captures the blurred image 14 (illustrated in FIG. 1). However, in this embodiment, the blurred image 14 is transferred to a computer 672 (e.g. a personal computer) that includes a computer control system 618 (illustrated in phantom) that uses the estimation method disclosed herein to estimate the blur direction. Further, the computer control system 618 can deblur the blurred image 14 and provide the adjusted image 455 (illustrated in FIG. 4).

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for estimating a blur direction of motion blur in a blurred image, the method comprising the steps of:
    blurring the blurred image along at least a first test direction and a second test direction that is different than the first test direction to create artificially blurred first and second test images;
    determining the test direction which has the largest blur difference between the test images; and
    estimating the blur direction based on the test direction with the largest blur difference.

2. The method of claim 1 further comprising a step of blurring the blurred image along a third test direction that is different than the first and second test directions to create an artificially blurred third test image.

3. The method of claim 2 further comprising a step of comparing the third test image with the blurred image to determine a third blurred difference between the third test image and the blurred image.

4. The method of claim 2 wherein the third test direction is perpendicular to the second test direction.

5. The method of claim 1 further comprising the step of deconvolving the blurred image to provide an adjusted image.

6. The method of claim 1 wherein the step of estimating includes the step of estimating the blur direction as being perpendicular to the test direction with the largest blur difference.

7. A device for estimating a blur direction of motion blur in a blurred image, the device comprising:
    a control system that blurs the blurred image along at least a first test direction and a second test direction that is different than the first test direction to create artificially blurred first and second test images, the control system determining the test direction which has the largest blur difference between the test images; and an estimator that estimates the blur direction based on the test direction with the largest blur difference.

8. The device of claim 7 wherein the control system blurs the blurred image along a third test direction that is different than the first and second test directions to create an artificially blurred third test image.

9. The device of claim 8 wherein the control system sets the third test direction such that the third test direction is perpendicular to the second test direction.

10. The device of claim 7 wherein the control system deconvolves the blurred image to provide an adjusted image.

11. The device of claim 7 further comprising a capturing system for capturing the blurred image.

12. The device of claim 7 wherein the estimator estimates the blur direction as being perpendicular to the test direction with the largest blur difference.

13. A method for estimating a blur direction of motion blur in a blurred image, the method comprising the steps of:

blurring the blurred image along a first test direction to create an artificially blurred first test image;

comparing the artificially blurred first test image with the blurred image to determine a first blur difference between the artificially blurred first test image and the blurred image;

blurring the blurred image along a second test direction that is different than the first test direction to create an artificially blurred second test image;

comparing the artificially blurred second test image with the blurred image to determine a second blur difference between the artificially blurred second test image and the blurred image; and evaluating the artificially blurred test images to estimate if one of the test directions is similar to the blur direction by comparing the first blur difference and the second blur difference.

14. The method of claim 13 wherein if the first blur difference is larger than the second blur difference, the first test direction is not similar to the blur direction; and wherein if the second blur difference is larger than the first blur difference, the second test direction is not similar to the blur direction.

15. The method of claim 13 further comprising the steps of blurring the blurred image along a third test direction that is different than the first and second test directions to create an artificially blurred third test image, and comparing the artificially blurred third test image with the blurred image to determine a third blur difference between the artificially blurred third test image and the blurred image.

16. The method of claim 15 wherein the step of evaluating includes evaluating the artificially blurred test images to estimate if one of the test directions is similar to the blur direction by comparing the first blur difference, the second blur difference and the third blur difference.

17. The method of claim 16 further comprising the step of estimating the blur direction to be the test direction having the smallest blur difference.

18. The method of claim 16 further comprising the steps of determining the test direction which has the largest blur difference, and estimating the blur direction as being perpendicular to the test direction with the largest blur difference.

19. The method of claim 16 further comprising the steps of (i) selecting the test direction that results in the smallest blur difference as a first possible blur direction, (ii) selecting a direction that is perpendicular to the test direction that results in the largest blur difference as a second possible blur direction, and (iii) averaging the first possible blur direction and the second possible blur direction to estimate the blur direction.

20. The method of claim 13 further comprising the step of deconvolving the blurred image to provide an adjusted image.

* * * * *